United States Patent
Shieh et al.

(10) Patent No.: US 6,671,429 B2
(45) Date of Patent: Dec. 30, 2003

(54) BALANCED COUPLER FOR RADIATION SOURCES

(75) Inventors: William Shieh, Columbia, MD (US); Thomas R. Clark, Jr., Columbia, MD (US); Vladimir Petricevic, Columbia, MD (US)

(73) Assignee: Dorsal Networks, Inc., Columbia, MD (US)

( * ) Notice: Subject to any disclaimer, the term of this patent is extended or adjusted under 35 U.S.C. 154(b) by 0 days.

(21) Appl. No.: 09/969,142

(22) Filed: Oct. 3, 2001

(65) Prior Publication Data

US 2003/0063846 A1 Apr. 3, 2003

(51) Int. Cl.[7] ................................................. G02B 6/28
(52) U.S. Cl. ........................................................ 385/24
(58) Field of Search ............................. 385/24, 31, 76, 385/88; 250/227.27; 356/73.1, 479; 359/110, 177, 337, 337.2

(56) References Cited

U.S. PATENT DOCUMENTS

| | | | |
|---|---|---|---|
| 3,705,992 A | 12/1972 | Ippen et al. ................ 307/88.3 |
| 4,401,364 A | 8/1983 | Mochizuki ................ 350/96.16 |
| 4,616,898 A | 10/1986 | Hicks, Jr. ................ 350/96.15 |
| 4,805,977 A | 2/1989 | Tamura et al. ........... 350/96.16 |
| 5,173,957 A | 12/1992 | Bergano et al. ................ 385/24 |
| 5,500,733 A | * 3/1996 | Boisrobert et al. ..... 250/227.27 |
| 5,696,707 A | * 12/1997 | Hentschel et al. ............ 702/69 |
| 5,764,405 A | 6/1998 | Alphonsus .................. 359/341 |
| 5,878,528 A | * 3/1999 | Pattyn ............................ 47/32 |
| 5,920,423 A | 7/1999 | Grubb et al. ................. 359/334 |
| 5,991,069 A | 11/1999 | Jander ........................ 359/337 |
| 6,052,219 A | 4/2000 | Kidorf et al. ................ 359/334 |
| 6,052,393 A | 4/2000 | Islam ............................. 372/6 |
| 6,122,298 A | 9/2000 | Kerfoot, III et al. ............ 372/6 |
| 6,134,032 A | 10/2000 | Kram et al. .................. 359/110 |
| 6,134,033 A | 10/2000 | Bergano et al. ............. 359/122 |
| 6,137,604 A | 10/2000 | Bergano ..................... 359/124 |
| 6,141,468 A | 10/2000 | Kidorf et al. .................. 385/24 |
| 6,147,794 A | 11/2000 | Stentz ......................... 359/334 |
| 6,147,796 A | 11/2000 | Ma et al. ..................... 359/341 |
| 6,151,160 A | 11/2000 | Ma et al. ..................... 359/341 |
| 6,175,436 B1 | * 1/2001 | Jackel ......................... 359/349 |
| 6,181,464 B1 | 1/2001 | Kidorf et al. ................ 359/334 |
| 6,292,288 B1 | 9/2001 | Akasaka et al. ............. 359/334 |
| 6,320,884 B1 | 11/2001 | Kerfoot, III et al. ............ 372/3 |
| 6,359,728 B1 | * 3/2002 | Angellieri et al. ........... 359/345 |
| 6,429,965 B1 | * 8/2002 | Falquier et al. .......... 359/341.1 |

OTHER PUBLICATIONS

Emori et al., "100nm Bandwidth Flat–Gain Raman Amplifiers Pumped and Gain–Equalised by 12–Wavelength–Channel WDM Laser Diode Unit", Electronics Letters, 1999, pp. 1–2, vol. 35, No. 16. (No date).

(List continued on next page.)

*Primary Examiner*—Akm Enayet Ullah

(57) ABSTRACT

An optical coupler system is described. The optical coupler system is for coupling radiation from a plurality of radiation sources. The optical coupler system comprises a first optical coupler having at least a first and a second input and a first and a second output. The optical coupler also comprises a second optical coupler having at least a first and a second input and a first and a second output, wherein the first and second outputs of the first optical coupler are connected to the first and second inputs, respectively, of the second optical coupler via first and second optical links, and wherein the first and second links provide different optical paths between the first and second optical couplers such that portions of radiation energy that is input to the first input of the first optical coupler are combined incoherently at the first output of said second optical coupler.

34 Claims, 8 Drawing Sheets

OTHER PUBLICATIONS

Kidorf et al., "Pump Interactions in a 100–nm Bandwidth Raman Amplifier", Photonics Technology Letters, 1999, pp. 530–532, vol. II, No. 5, IEEE.

Runge et al., "AT&T Optical Amplifier Systems", pp. 72–77. (No date).

Bubel et al., "Reliability for the SL2000 Optical Amplifier Systems", Conferences Affichees, pp. 161–165. (No date).

Ibsen et al., "8– and 16–Channel All–Fiber DFB laser WDM Transmitters with Integrated Pump Redundancy", Photonics Technology Letters, 1999, pp. 1114–1116, vol. 11, No. 9, IEEE. (No date).

Judy et al., "Fiber Effective Area and Raman–Pumped 40 Gb/s Transmission Systems", Lucent Technologies 2000, pp. 143–145. (No date).

Namiki et al., "Recent Advances in Ultra–Wideband Raman Amplifiers", Photonics Technol. Letter, 2000 pp. FF1–1–FF1–4. (No date).

Kidorf et al., "Pump Interactions in a 100–nm Bandwidth Raman Amplifier", Photonics Technology Letters, 1999, pp. 530–532, vol. 11, No. 5, IEEE. (No date).

Bergano, "Undersea Amplified Lightwave Systems Design", Chapter 10 of Optical Fiber, Telecommunications, 1997, pp. 302–335, vol. IIIA, Lucent Technologies. (No date).

Emori et al., "Demonstration of Broadband Raman Amplifiers: A Promising Application of High–Power Pumping Unit", Furukawa Review, 2000, pp. 59–62, No. 19, WDM Team, Opto–Technology Lab., R&D Div. (No date).

"Undersea Communications Technology", AT&T Technical Journal, 1995, pp. 1–103, vol. 74, No. 1, AT&T. (No date).

* cited by examiner

BALANCED COUPLER FOR RADIATION SOURCES

FIELD OF THE INVENTION

This invention relates to optical communications and specifically to a balanced coupler for coupling multiple radiation sources and an optical amplifier and transmission system using the balanced coupler.

BACKGROUND OF THE INVENTION

Wave division multiplexing (WDM) increases bandwidth in optical communications by providing for communication over several wavelengths or channels. For long haul optical communications the optical signal must be periodically amplified. Current amplification schemes include Erbium doped fiber amplifiers (EDFA) and Raman amplifiers.

To maximize WDM capacity, it is desirable that the optical bandwidth of the system be as wide as possible. Thus, a wide range of optical signal wavelengths must be amplified. At the same time, it is desirable that the different optical signal wavelengths be amplified by about the same amount by the amplifiers in the amplification system. Thus, it is desirable that the amplification gain profile of the amplification system should be both broad and relatively flat.

Raman amplification can provide a broad and relatively flat gain profile over the wavelength range used in WDM optical communications by using a plurality of different pump laser wavelengths. (See Y. Emori, "100 nm bandwidth flat-gain Raman Amplifiers pumped and gain-equalized by 12-wavelength channel WDM Diode Unit," Electronic Lett., Vol. 35, no. 16, p. 1355 (1999). and F. Koch et. al., "Broadband gain flattened Raman Amplifiers to extend to the third telecommunication window," OFC' 2000, Paper FF3, (2000)). Raman amplifiers may be either distributed or discrete (See High Sensitivity 1.3 (m Optically Pre-Amplified Receiver Using Raman Amplification," Electronic Letters, vol. 32, no. 23, p. 2164 (1996)). The Raman gain material in distributed Raman amplifiers is the transmission optical fiber, while a special spooled gain fiber is typically used in discrete Raman amplifiers.

FIG. 1 is a schematic of a typical optical communication system using Raman amplifiers for periodic amplification of the optical signal. The system includes transmitter terminal 10 and receiver terminal 12. The transmitter terminal includes a number of optical communication transmitters 14a, 14b, . . . 14z respectively transmitting signals at optical communications wavelengths λa, λb, . . . λz.

The optical signals are multiplexed by multiplexer 16 and are amplified by a series of amplifiers A1, A2, . . . An. The signals are transmitted from the transmitter 10 to the amplifiers, between the amplifiers, and from the amplifiers to the receiver 12 via transmission optical fiber 26. For distributed Raman amplification, the optical amplifier will also include transmission optical fiber. The optical signals are then demultiplexed by demultiplexer 18 of receiver 12 to respective optical communications receivers 20a, 20b, . . . 20z. The demultiplexer 18 sends optical communications wavelengths λa, λb, . . . λz to respective optical communications receivers 20a, 20b, . . . 20z.

Although FIG. 1 shows signals directed from transmitter terminal 10 to receiver terminal 12 for ease of illustration, in general the transmitter terminal 10 and receiver terminal 12 are typically transmitter/receiver terminals for bidirectional communication. In this case each of the transmitter/receiver terminals will have transmitters as well as receivers and both a multiplexer and demultiplexer.

FIG. 2 is a schematic of a typical distributed Raman optical amplifier 50 employed as one of the amplifiers in the series of amplifiers A1, A2, . . . An in the system of FIG. 1. The amplifier 50 includes optical pump assembly 51 (shown enclosed by dashed lines) and transmission fiber 64. In this amplification scheme, the pump assembly 51 includes a pump radiation source 52 that provides, for example, twelve different pump wavelengths $\lambda_1$ through $\lambda_{12}$. Specifically, the pump radiation source 52 comprises a plurality of pump sources, i.e., twelve lasers 56 that each emit radiation at a different wavelength of the wavelengths $\lambda_1$ through $\lambda_{12}$, respectively. The radiation from the individual radiation sources 56 of the pump radiation source 52 are then coupled or combined at a pump radiation coupler 54, and the coupled radiation is output at pump radiation coupler output 58.

The coupled radiation has a coupled radiation profile that is a combination of the individual radiation profiles of the radiation input into the pump radiation coupler 54. The pump radiation profile, that will be coupled with the optical signal to be amplified, is therefore the coupled radiation profile in this case. Thus, the pump radiation profile is output from output 58. The pump radiation profile from output 58 is then coupled at pump-signal combiner 60 with the optical signal 62. Optical signal 62, i.e., the data signal, propagates in the transmission optical fiber 64 in a direction opposite to the radiation, i.e., a counterpropagation direction, of the pump radiation profile. The optical signal is amplified along transmission optical fiber 62.

SUMMARY OF THE INVENTION

It would be desirable to provide an optical coupler system that could provide substantially the same optical output power at each output of the coupler.

According to one embodiment of the invention there is provided an optical coupler system. The optical coupler system comprises: a first optical coupler having at least a first and a second input and a first and a second output; and a second optical coupler having at least a first and a second input and a first and a second output. The first and second outputs of the first optical coupler are connected to the first and second inputs, respectively, of the second optical coupler via first and second optical links, and the radiation that is input to the first input of the first optical coupler is coupled to both the first and second optical links to travel over first and second paths as first path radiation and second path radiation. At the second coupler the second path radiation is incoherently combined with the first path radiation for output on the first output of the second coupler.

According to another embodiment of the invention there is provided an optical coupler system. The optical coupler system comprises: a first optical coupler having at least a first and a second input and a first and a second output; and a second optical coupler having at least a first and a second input and a first and a second output. The first and second outputs of the first optical coupler are connected to the first and second inputs, respectively, of the second optical coupler via first and second optical links. The first and second links provide different optical paths between said first and second optical couplers such that portions of radiation energy that is input to said first input of said first optical coupler are combined incoherently at said first output of said second optical coupler.

According to another embodiment of the invention there is provided an optical coupler. The optical coupler system comprises: a series of N couplers optically connected in series, where N is an integer greater than 1, the couplers in the series numbered i=1 to i=N, each ith coupler having at least first and second inputs and at least first and second ouputs; and a series of N−1 groups of optical links, the series of groups numbered j=1 to j=N−1, wherein each optical,link of the jth group of optical links optically connects a respective output of the ith coupler to a respective input of the (i+1)th coupler when i=j. The optical links provide different optical paths between said first and Nth optical couplers such that portions of radiation energy that is input to said first input of said first optical coupler are combined incoherently at said first output of said Nth optical coupler.

According to another embodiment of the invention there is provided a method of coupling radiation. The method comprises: inputting radiation from a first radiation source of a plurality of radiation sources into a first input of a first optical coupler having a plurality of inputs, wherein the first optical coupler is coupled to a second optical coupler via a plurality of optical links, the second coupler having a plurality of outputs including a first output; propagating portions of the radiation along different respective optical paths between the first input of the first optical coupler and the first output of the second optical coupler; coupling the portions of the radiation at the second coupler; and wherein the optical links provide different optical paths between said first and second optical couplers such that the portions of radiation energy that is input to said first input of said first optical coupler are combined incoherently at the second coupler.

According to another embodiment of the invention there is provided an optical pump assembly. The optical pump assembly comprises: a plurality of pump radiation sources; and an optical coupler system. The optical coupler system comprises: a first optical coupler having at least a first and a second input and a first and a second output, the first and second input adapted for receiving radiation from respective radiation sources of the plurality of pump radiation sources; and a second optical coupler having at least a first and a second input and a first and a second output. The first and second outputs of said first optical coupler are connected to said first and second inputs, respectively, of said second optical coupler via first and second optical links. The first and second links provide different optical paths between said first and second optical couplers such that portions of radiation energy that is input to said first input of said first optical coupler are combined incoherently at said first output of said second optical coupler.

DETAILED DESCRIPTION OF THE PREFERRED EMBODIMENTS

The coupler system of the present invention allows for the coupling of several individual pump radiation sources and at the same time can provide that the output power of the combined radiation at the outputs of the coupler system is substantially the same. Because the coupler system can provide for a more uniform power output, the coupler system can provide uniform pump radiation power that provides a uniform gain across different signal optical paths amplified by the pump radiation. The present inventors have realized that a coupler system with an improved uniformity in radiation output power can be implemented by arranging more than one coupler in series with outputs of a coupler in the series connected to the inputs of the next coupler in the series.

Figure 1:
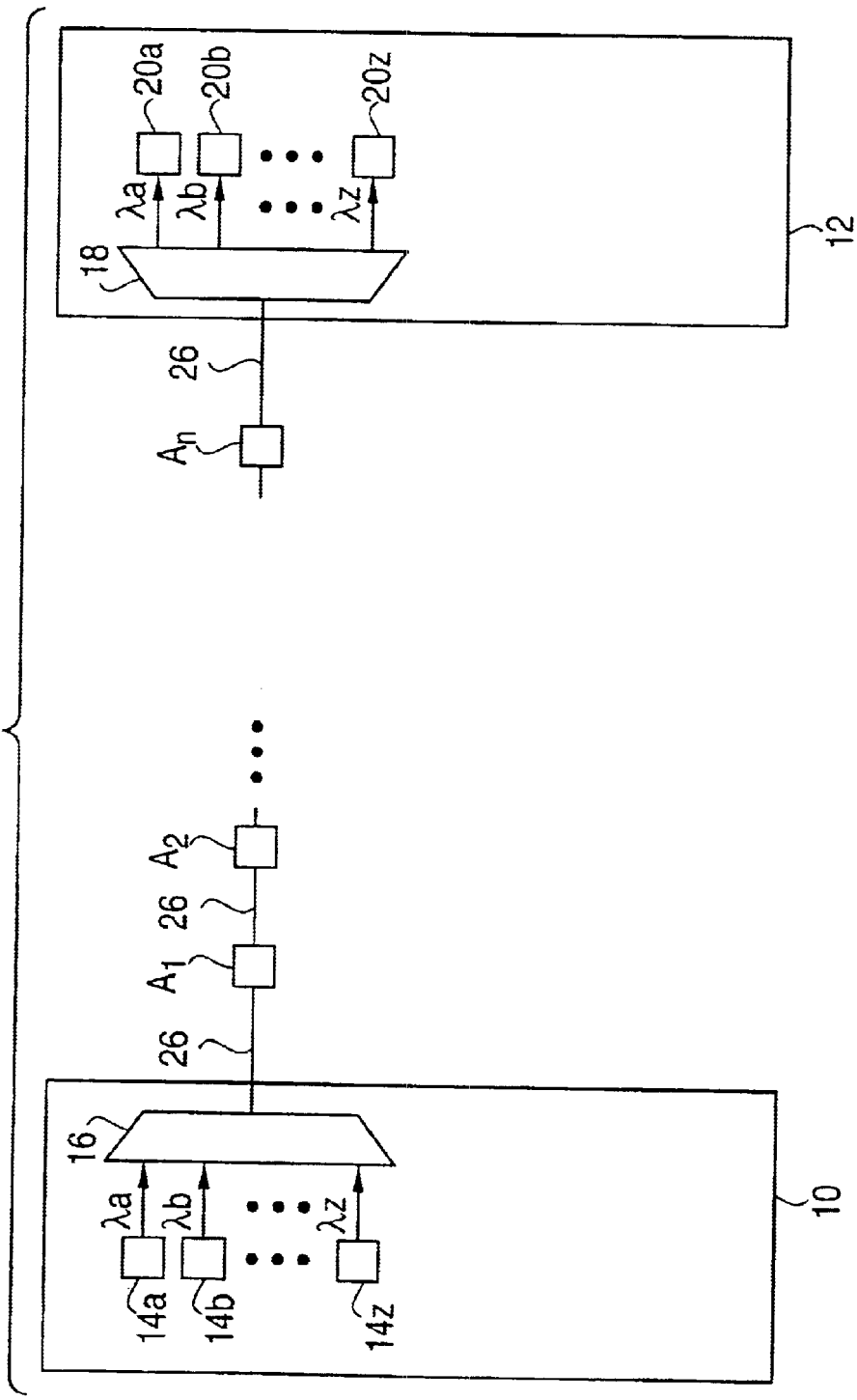
FIG. 1 is a schematic of a prior art optical communication system using Raman amplifiers or periodic amplification of the optical signal.
Figure 2:
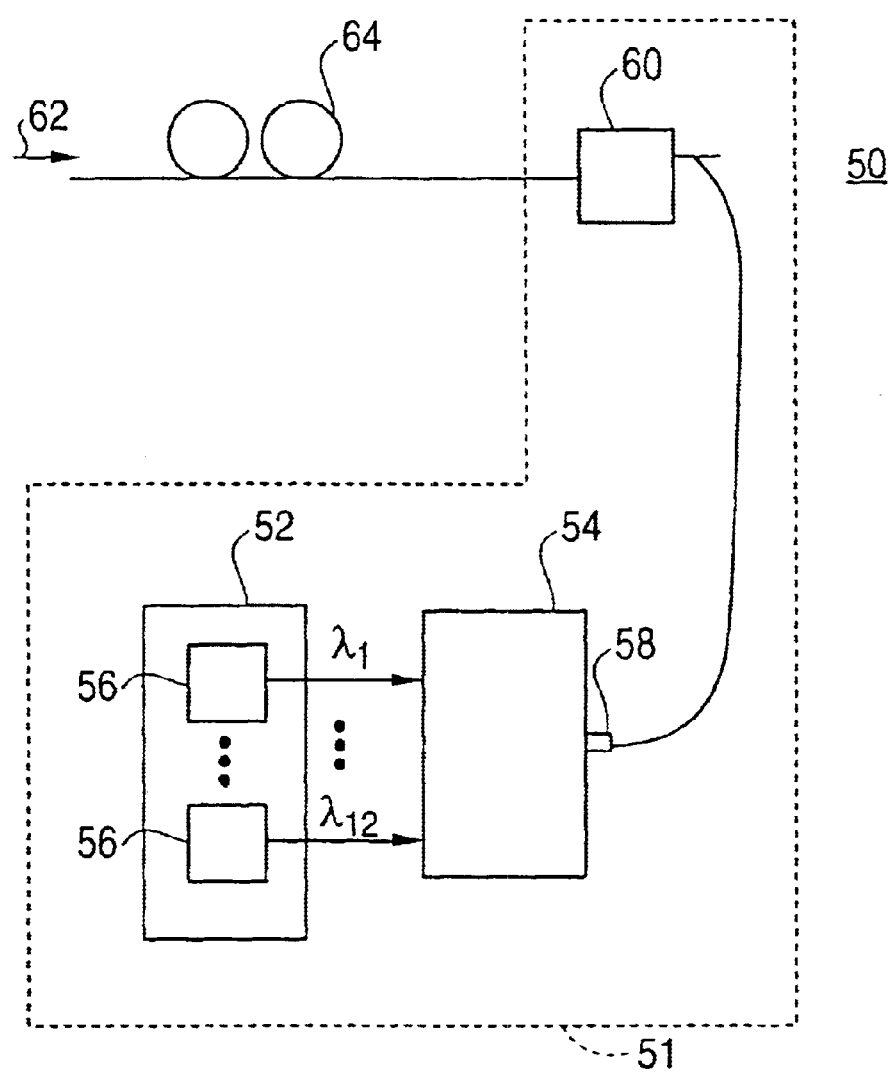
FIG. 2 is a schematic of a typical amplifier employed in the optical communication system of FIG. 1.
Figure 3:
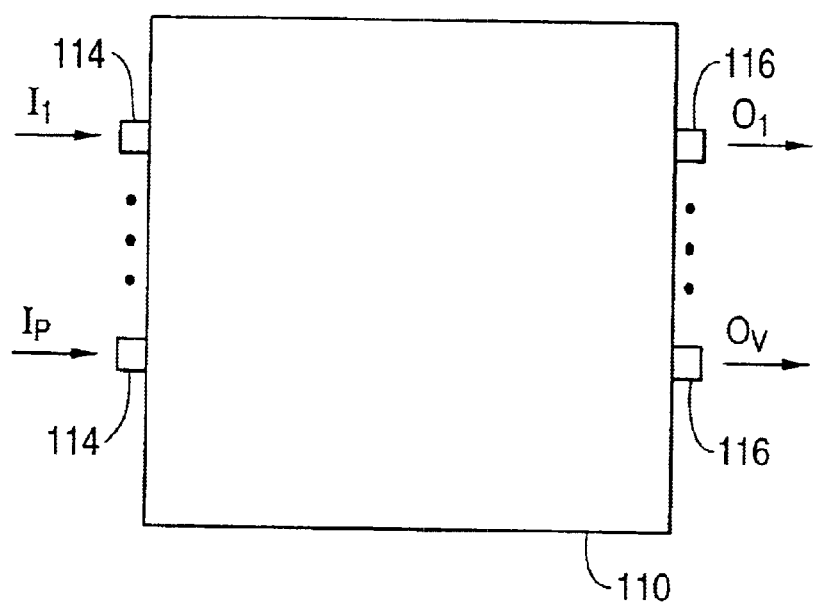
FIG. 3 is a schematic of an optical coupler system with a single optical coupler.

The imbalance of output power for a single coupler will be explained with respect to FIG. 3. FIG. 3 illustrates a P×V coupler 110, i.e., a coupler with P inputs and V outputs. The inputs 114 of the coupler 110 may be respectively coupled to individual pump radiation sources (not shown). Typically, the pump radiation sources provide radiation with respectively different wavelengths $\lambda$. In general, the radiation corresponding to each wavelength $\lambda$ will not be only the wavelength $\lambda$, but a range of wavelengths with $\lambda$ as the peak wavelength. This is so because a radiation source providing the wavelength $\lambda$ will not provide an infinitely narrow range of wavelengths. Thus, it is understood that radiation generated at a wavelength $\lambda$ will include a finite bandwidth of wavelengths around $\lambda$. The radiation input at the inputs 114 is denoted by the radiation $I_1$ through $I_P$ for the respective inputs 114 as shown in FIG. 3.

The radiation input into the coupler 110 is coupled by the coupler and output at outputs 116. The coupled radiation is a combination of the input radiation, and thus the coupled radiation will typically have a contribution from radiation with a variety of wavelengths, i.e., the wavelengths of the input radiation. The radiation output at each of the outputs 116 will also have a contribution from each of the wavelengths of the input radiation. The output radiation at the respective outputs 116 is denoted by the radiation $O_1$ through $O_V$ for the respective outputs as shown in FIG. 3.

The coupler 110, however, will generally not be perfectly balanced, i.e., the power output at the different outputs 116 will not be the same. The imbalance of the coupler outputs can be illustrated for a 2×2 coupler, i.e., a coupler with both P and V equal to 2, with 2 inputs, having respective input powers $P_{I1}$ and $P_{I2}$, and 2 outputs having respective output powers $P_{O1}$ and $P_{O2}$. Assuming that radiation input into the two inputs is not coherent with respect to each other, the coupling can be expressed as pure power coupling instead of simply electric field coupling. Thus, even if the radiation sources coupled to the respective coupler inputs individually provide coherent radiation, it is assumed that the radiation provided at the inputs is not relatively coherent. In this case, the output powers $P_{O1}$ and $P_{O2}$ are given by the following equations:

$$P_{O_1} = \left(\frac{1}{2} - \frac{\alpha_1}{2}\right)P_{I2} + \left(\frac{1}{2} + \frac{\alpha_1}{2}\right)P_{I1} \qquad \text{Eq. 1}$$

$$P_{O2} = \left(\frac{1}{2} + \frac{\alpha_1}{2}\right)P_{I2} + \left(\frac{1}{2} - \frac{\alpha_1}{2}\right)P_{I1} \qquad \text{Eq. 2}$$

where $\alpha_1$ is the imbalance factor between the two outputs. From Eqs. 1 and 2 the difference in the output powers $P_{O1}$ and $P_{O2}$ can be expressed as $$P_{O2} - P_{O1} = \alpha_1(P_{I1} - P_{I2}) \qquad \text{Eq. 3}$$

In general the coupler will also introduce some losses, but these losses are neglected for the purpose of illustration.

For a perfectly balanced coupler $\alpha_1$ would have a value of zero and thus $P_{O1}$ and $P_{O2}$ would be equal to one another. Generally, however, a coupler will not be perfectly balanced and $\alpha_1$ would not have a value of zero. Thus, the output power of the outputs 116 is not substantially uniform.

The present inventors have realized that by coupling a plurality of single couplers together in a coupling system, the output power imbalance of the overall coupling system can be reduced. By providing couplers in multiple stages instead of a single stage the output power imbalance of the coupling system can be reduced.

Figure 4:
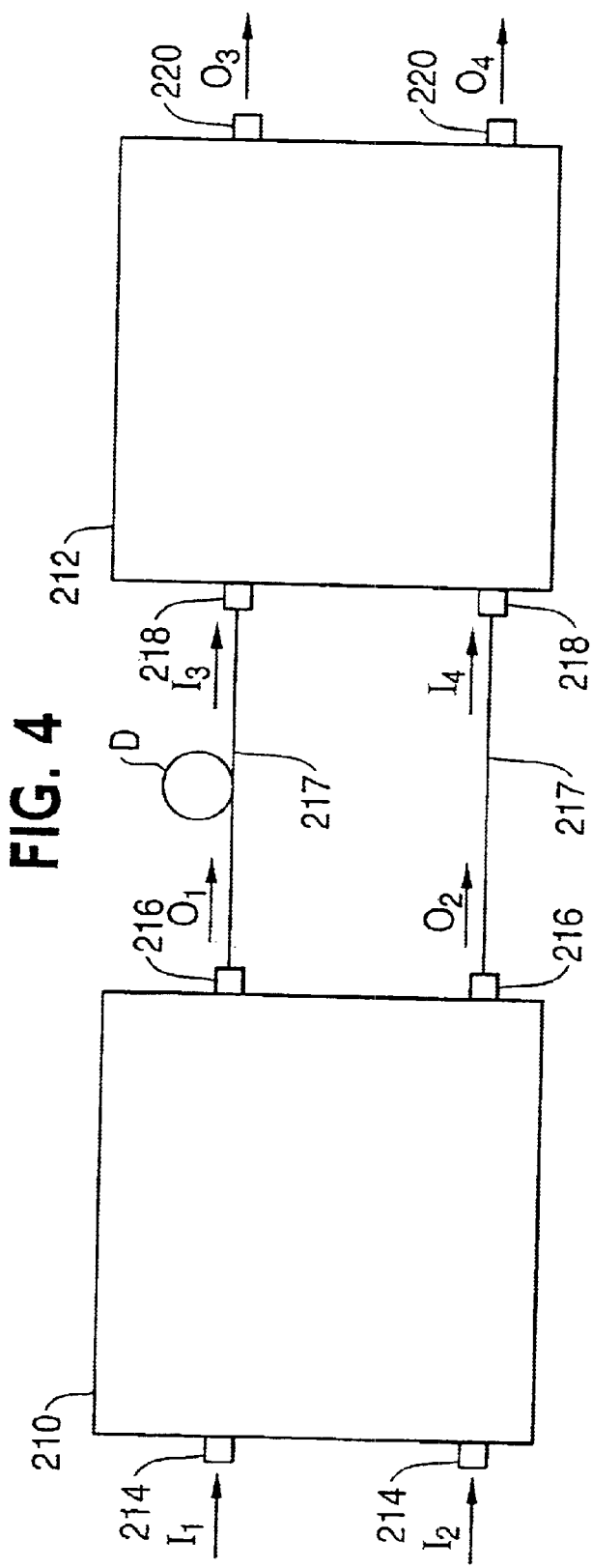
FIG. 4 is a schematic of an optical coupler system according to one embodiment of the present invention.

FIG. 4 illustrates a coupler system according to the present invention with two 2×2 couplers coupled in series. A first coupler 210 is connected in series with a second coupler 212. The first coupler 210 has two inputs 214 and two outputs 216. The inputs of the first coupler 210 are adapted for receiving pump radiation from respective radiation sources (not shown) of a plurality of radiation sources. Typically, the radiation sources provide radiation with respectively different wavelengths. The radiation input at the respective inputs 214 is denoted by the radiation $I_1$ and $I_2$ as shown in FIG. 4. The specific radiation sources employed will depend upon the application and may be substantially coherent radiation sources. If high power radiation sources are desired, the radiation sources may be lasers, such as semiconductor lasers, for example.

The first coupler 210 couples the radiation input into the coupler 210 and outputs the coupled radiation at outputs 216. As with the single coupler shown in FIG. 3, the first coupler 210 in FIG. 4 couples the radiation input into the coupler to provide coupled radiation which is a combination of the input radiation, and thus the coupled radiation will typically have a contribution from radiation with a variety of wavelengths, i.e., the wavelengths of the input radiation. Thus, the radiation output at each of the outputs 216 will also have a contribution from each of the wavelengths of the input radiation, and the radiation is output as a first set of radiation profiles, each radiation profile from a respective output. The output radiation at the respective outputs 216 of the first coupler 210 is denoted by the radiation $O_1$ and $O_2$ for the respective outputs as shown in FIG. 4. The radiation $O_1$ and $O_2$ has respective output powers, $P_{O1}$ and $P_{O2}$.

The outputs 216 of the first coupler 210 are respectively coupled to the inputs 218 of the second coupler 212 via optical links 217. Thus, radiation from the first set of radiation profiles is propagated along respective optical links 217, coupled at the second coupler 212, and output as a second set of radiation profiles at respective outputs 220. The optical links may comprise optical fiber, for example. The radiation input at the respective inputs 218 of the second coupler 212 is denoted by the radiation $I_3$ and $I_4$ as shown in FIG. 4. Neglecting losses in optical links 217, the inputs powers $P_{I3}$ and $P_{I4}$ at the second coupler should be the same, respectively, as the output powers $P_{O1}$ and $P_{O2}$ from the first coupler. In a similar fashion to the first coupler 210, the second coupler 212 acts to couple the radiation input into the coupler and outputs the coupled radiation at outputs 220. The output-radiation at the respective outputs 220 is denoted by the radiation $O_3$ and $O_4$ for the respective outputs 220 as shown in FIG. 4. The radiation $O_3$ and $O_4$ has respective output powers, $P_{O3}$ and $P_{O4}$.

The first and second couplers may be identical or may be different, if desired. The first and second couplers may be, for example, 3-dB fused couplers or 3-dB thin film micro-optic couplers.

The two optical links 217 do not have an identical optical path length. As shown in FIG. 4, one of the optical links 217 has an additional delay optical path length D as represented by the loop in the one of the optical links 217. This additional optical path length D is greater than the coherence length of the radiation sources that provide radiation to the first coupler 210.

Figure 5:
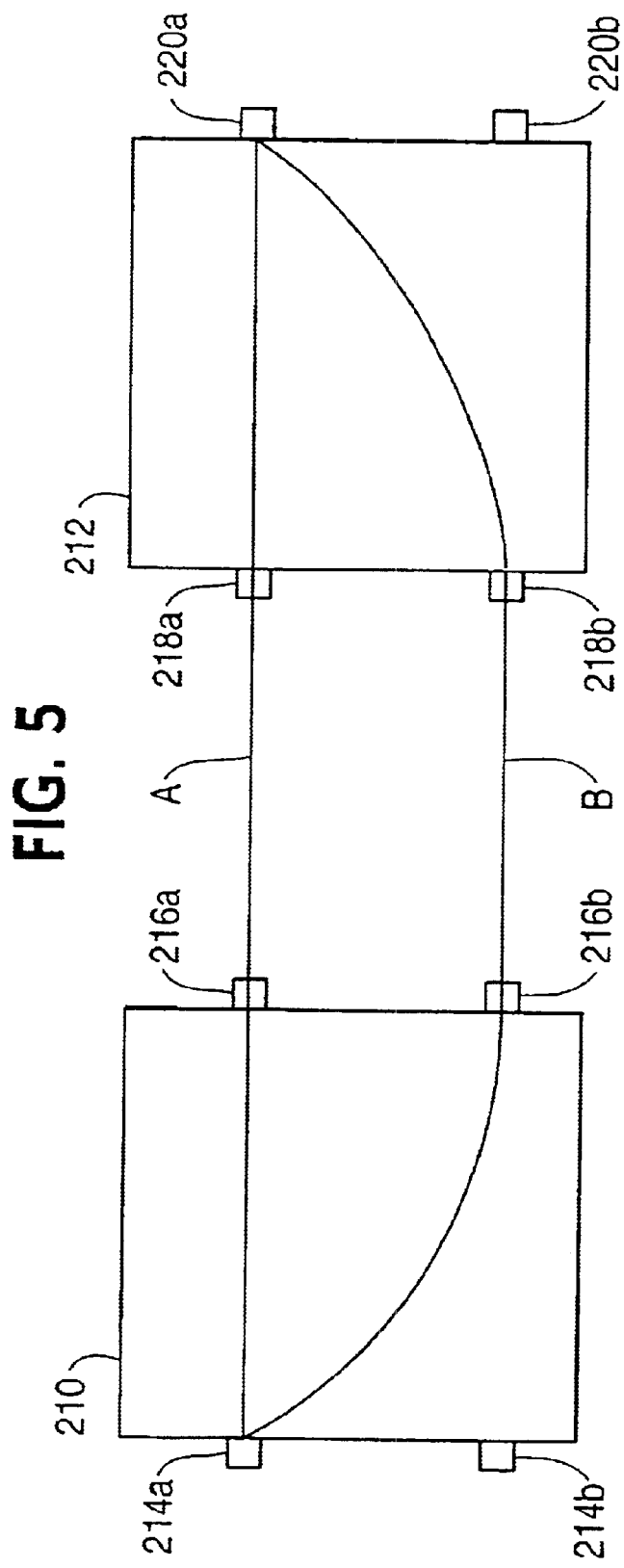
FIG. 5 is a schematic of the optical coupler system of FIG. 4 illustrating different optical paths between a first coupler input and a second coupler output.

As explained schematically in FIG. 5, radiation traveling along different optical paths between an input 214a of the first coupler 210 to an output 220a of the second coupler 212 is not coherent relative to each other. The first coupler 210 has first and second inputs 214a and 214b, and first and second outputs 216a and 216b, respectively. Similarly, the second coupler 212 has first and second inputs 218a and 218b, and first and second outputs 220a and 220b, respectively. Optical links 217a and 217b, respectively optically connect outputs 216a and 216b to inputs 218a and 218b.

FIG. 5 shows two optical paths, A and B, between one of the first inputs 214a and one of the first outputs 220a. Path A is from the first output 214a of the first coupler 210 to the first output 216a of the first coupler 210, to the first input 218a of the second coupler 212 and to the first output 220a of the second coupler 212. The second optical path B is from the first output 214a of the first coupler to the second output 216b of the first coupler, to the second input 218b of the second coupler and to the first output 220a of the second coupler. The portion of the radiation traveling along the path A from the first input is coupled with the portion of the radiation from the first input traveling along path B of the second coupler 212. The different optical paths A and B are different by an amount greater than the coherence length of the radiation input at the first input 214a of the first coupler 210.

FIG. 5 illustrates the difference in optical paths between input 214a and output 220a. In a similar fashion (not shown in FIG. 5), the difference in optical paths between each of the inputs 214a and 214b of the first coupler 210 and the outputs 220a and 220b of the second coupler 212 is greater than the coherence length of the radiation input at the respective inputs of the first coupler.

Returning to FIG. 4, the radiation traveling along the different optical paths between respective inputs of the first coupler 210 and respective outputs of the second coupler 212 is not coherent relative to each other when coupled at the second coupler. In this case, the difference in the output powers $P_{O3}$ and $P_{O4}$ at the outputs 220 of the second coupler 212 may be expressed in terms of the imbalance factors of the first and second couplers, $\alpha_1$ and $\alpha_2$, and the input powers $P_{I1}$ and $P_{I2}$ of the inputs 214 of the first coupler as follows:

$$P_{O4} - P_{O3} = \alpha_2(P_{I4} - P_{I3}) = \alpha_2(P_{O2} - P_{O1}) = \alpha_1 \cdot \alpha_2 P_{I2} - P_{I1} \qquad \text{Eq. 4}$$

Thus, the two stage coupler reduces the power imbalance by a factor of $\alpha_2$. For example, if the imbalance factors $\alpha_1$ and $\alpha_2$ are both about 10%, the overall imbalance factor, which is the product of $\alpha_1$ and $\alpha_2$, would only be about 1%. Actual imbalance factors are expected to be between about 5% and 20% depending upon the coupler design and wavelengths of interest. Thus, the overall power imbalance at the outputs of the coupler system can be significantly reduced by providing a coupler system with stages of couplers according to the present invention.

Figure 6:
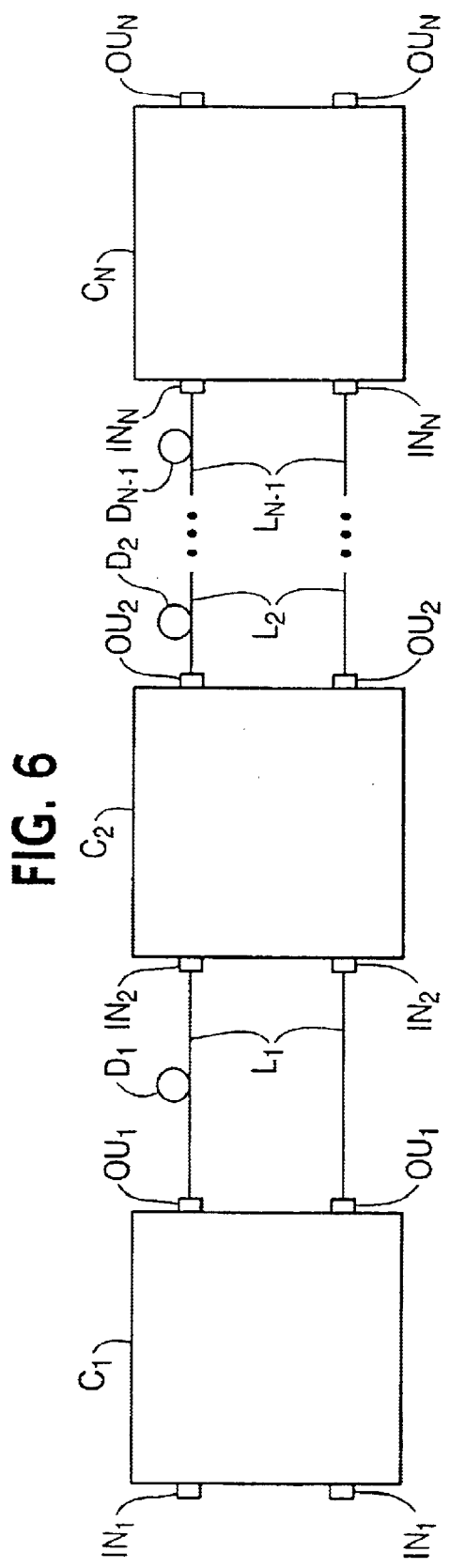
FIG. 6 is a schematic of an optical coupler system according to another embodiment of the present invention, where the system includes N couplers connected in series.

The imbalance of the output powers of the coupler system can be further reduced by increasing the number of stages of couplers. FIG. 6 illustrates an embodiment of the present invention with N stages of 2×2 couplers.

The coupler system of FIG. 6 includes N 2×2 couplers, the couplers denoted by $C_i$ where i ranges from 1 through N. $C_1$ denotes the first coupler receiving radiation from a plurality of radiation sources (not shown) and $C_N$ denotes the final coupler in the series. The couplers are connected serially from $C_1$ through $C_N$. The number of couplers N may be two or more. For example, N may be three, four or five.

Each of the couplers $C_i$ has inputs $IN_i$ and outputs $OU_i$. The inputs $IN_1$ of the first coupler $C_1$ are adapted for receiving radiation from respective radiation sources of a plurality of radiation sources (not shown). The inputs of the remaining couplers with i>1, are connected to the outputs of the previous coupler in the series, i.e., the inputs $IN_i$ are respectively connected to the outputs $OU_{i-1}$.

The inputs of the couplers (other than the first coupler) are connected to the outputs of the previous coupler in the series via groups of optical links. The groups of optical links are a series of N−1 groups of optical links, $L_j$, where j ranges from. 1 to N−1.

The first group of optical links $L_1$ optically connects the first outputs $OU_1$ to respective inputs of the second inputs $IN_2$. In general, except for the last outputs $OU_n$, the ith outputs $OU_i$ are connected to the (i+1)th inputs $IN_i$. The ith outputs $OU_i$ are connected to the (i+1)th inputs $IN_i$ via the jth group of optical links $L_j$, where j is equal to i.

The couplers may all be identical or may be different. The couplers may be, for example, 3-dB fused couplers or 3-dB thin film micro-optic couplers.

In the embodiment of FIG. 6, illustrating 2×2 couplers, each of the groups of optical links $L_j$ comprises two optical links. In a similar fashion to the embodiment of FIG. 4, in FIG. 6 the two optical links in a particular group of optical links $L_j$ have different optical path lengths. One of the two optical links in the $L_j$ group has an additional optical path length $D_j$ as represented by the loop in the optical links. This additional path length $D_j$ is greater than the coherence length of the radiation sources that provide radiation to. the first coupler $C_1$. In this way, the difference in the path lengths traveled by the portions of the radiation traveling along different optical paths between an input of the first coupler and an output of the Nth coupler is greater than the coherence length of the radiation. Thus, when these portions are combined at the Nth coupler, the portions are not coherent relative to each other. In this case the overall imbalance factor will be the product of the individual imbalance factors of the couplers. For N couplers with imbalance factors $\alpha_1$ through $\alpha_N$, the overall imbalance factor of the coupler system will be the product of the N imbalance factors. For example, for four 2×2 couplers each with an individual imbalance factor of 10%, the overall imbalance factor will be 0.01%.

Figure 7:
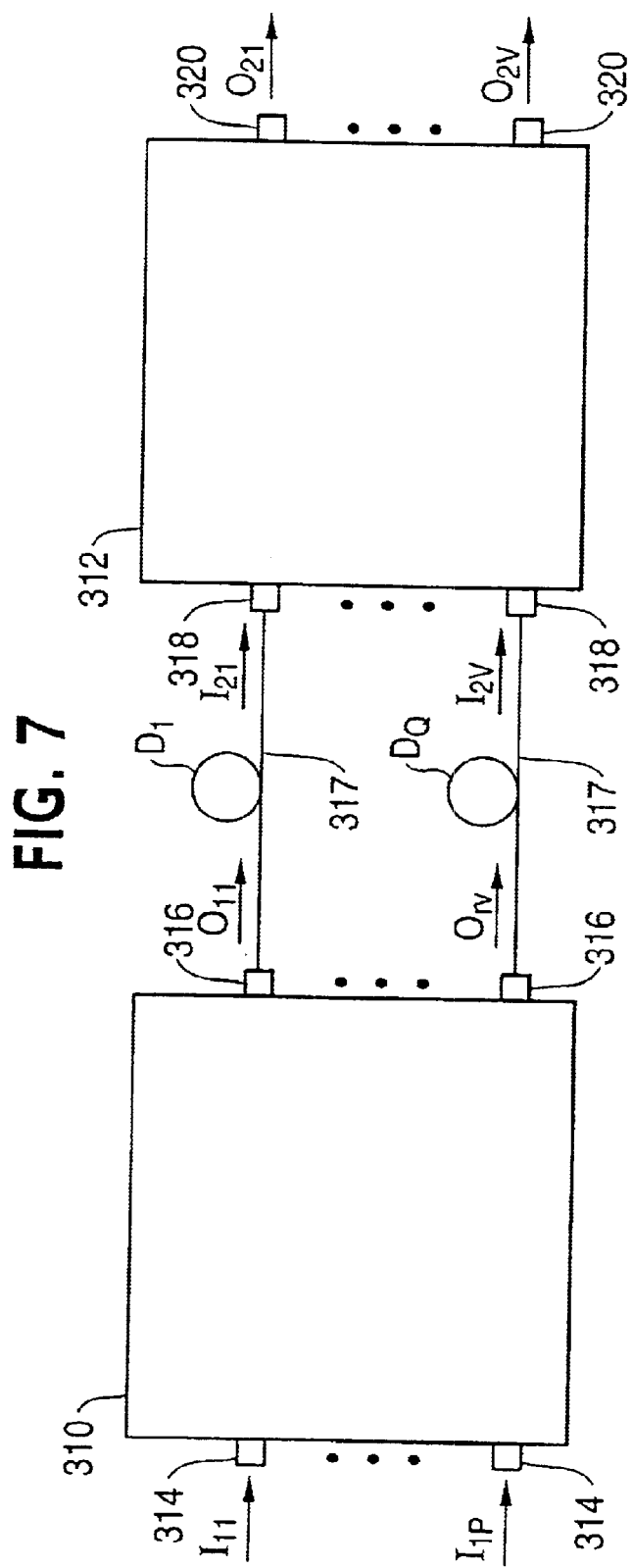
FIG. 7 is a schematic of an optical coupler system according to another embodiment of the present invention, where the system includes two P×V couplers in series.

FIG. 7 illustrates another embodiment of the invention with only two couplers in series, but with two P×V couplers, i.e., couplers with P inputs and V outputs. The coupler system of FIG. 7 has a first P×V coupler 310 optically connected to a second P×V coupler 312. The number of inputs of the couplers 310 and 312 may be the same or different. Likewise, number of outputs of the couplers 310 and 312 may be the same or different.

The first coupler 310 is connected in series with the second coupler 312. The first coupler 310 has P inputs 314 and V outputs 316. The inputs of the first coupler 310 are adapted for receiving pump radiation from respective radiation sources (not shown) of a plurality of radiation sources. Typically, the radiation sources provide radiation with respectively different wavelengths. The radiation input at the respective inputs 314 is denoted by the radiation $I_{11}$ through $I_{1P}$ as shown in FIG. 7. The radiation $I_{11}$ through $I_{1P}$ has respective input powers $P_{I11}$ through $P_{I1P}$. The specific radiation sources employed will depend upon the application and may be substantially coherent radiation sources. If high power radiation sources are desired the radiation sources may be lasers, such as semiconductor lasers, for example. Furthermore, not all of the inputs 314 need be connected to a source of radiation. Thus, some of the input powers $P_{I11}$ through $P_{I1P}$ may be zero.

The first coupler 310 couples the radiation input into the coupler 310 and outputs the coupled radiation at outputs 316. As with the single coupler shown in FIG. 3, the first coupler 310 in FIG. 7 couples the radiation input into the coupler to provide coupled radiation which is a combination of the input radiation, and thus the coupled radiation will typically have a contribution from radiation from a variety of wavelengths, i.e., the wavelengths of the input radiation. The radiation output at each of the V outputs 316 will also have a contribution from each of the wavelengths of the input radiation, and the radiation is output as a first set of radiation profiles, each radiation profile from a respective output. The output radiation at the respective V outputs 316 is denoted by the radiation $O_{11}$ through $O_{1V}$ for the respective outputs as shown in FIG. 7. The radiation $O_{11}$ through $O_{1V}$ has respective output powers, $P_{O11}$ though $P_{O1V}$.

The outputs 316 of the first coupler 310 are respectively coupled to the P inputs 318 of the second P×V coupler 312 via Q optical links 317. Thus, radiation from the first set of radiation profiles is propagated along respective optical links 317, coupled at the second coupler 312, and output as a second set of radiation profiles at respective outputs 320. The optical links may comprise optical fiber, for example. The radiation input at the respective inputs 318 is denoted by the radiation $I_{2I}$ through $I_{2P}$ as shown in FIG. 7. The radiation $I_{21}$ through $I_{2P}$ have optical powers $P_{I21}$ through $P_{I2P}$, respectively. Neglecting losses in the Q optical links 317, the input powers $P_{I2I}$ through $P_{I2P}$ at the second coupler should be the same, respectively, as the output powers coupled from the first coupler 310. If the number of outputs of the first coupler 310 is not equal to the number of inputs of the second coupler 312, some of first coupler outputs may not be connected to an input of the second coupler or some of the inputs of the second coupler may not be connected to an output of the first coupler. Even if the number of outputs of the first coupler 310 is equal to the number of inputs of the second coupler 312, some of the inputs and/or outputs may remain unconnected, as desired.

In a similar fashion to the first coupler 310, the second coupler 312 acts to couple the radiation input into the coupler and outputs the coupled radiation at outputs 320. The output radiation at the respective outputs 320 is denoted by the radiation $O_{21}$ through $O_{2V}$ for the respective outputs 320 as shown in FIG. 7. The radiation $O_{21}$ through $O_{2V}$ has respective output powers, $P_{O21}$ through $P_{O2V}$.

The optical links 317 do not have an identical optical path length. As shown in FIG. 7, the optical links have a respective delay path length $D_k$ as represented by the loops in the optical links, where k represents the kth path length of the optical link. The delay path lengths $D_k$ will all be different. Specifically, the delay path length of one of the path lengths will be different from the delay path length $D_k$ of the other path lengths by more than the coherence length of the radiation sources that provide radiation to the first coupler 310. In this way, the difference in the path lengths traveled by the portions of the radiation traveling along different optical paths between an input of the first coupler 310 and an output of the second coupler 312 is greater than the coherence length of the radiation. Thus, when these portions are combined at the second coupler 312, the portions are not coherent relative to each other.

Because the two P×V couplers 310 and 312 are connected in series, the imbalance of the overall coupler system will be reduced, as was the case in the embodiments of FIGS. 4 and 6. While the equation for the power imbalance for the individual couplers will generally be more complex than Eq. 3, nevertheless there will be an imbalance and coupling the individual couplers in series will reduce the overall system imbalance.

In the embodiment of FIG. 7, only two P×V couplers are connected in series. In general, more than two P×V couplers may be connected in series to further reduce the system imbalance in a fashion similar to that illustrated in the embodiment of FIG. 6.

Figure 8:
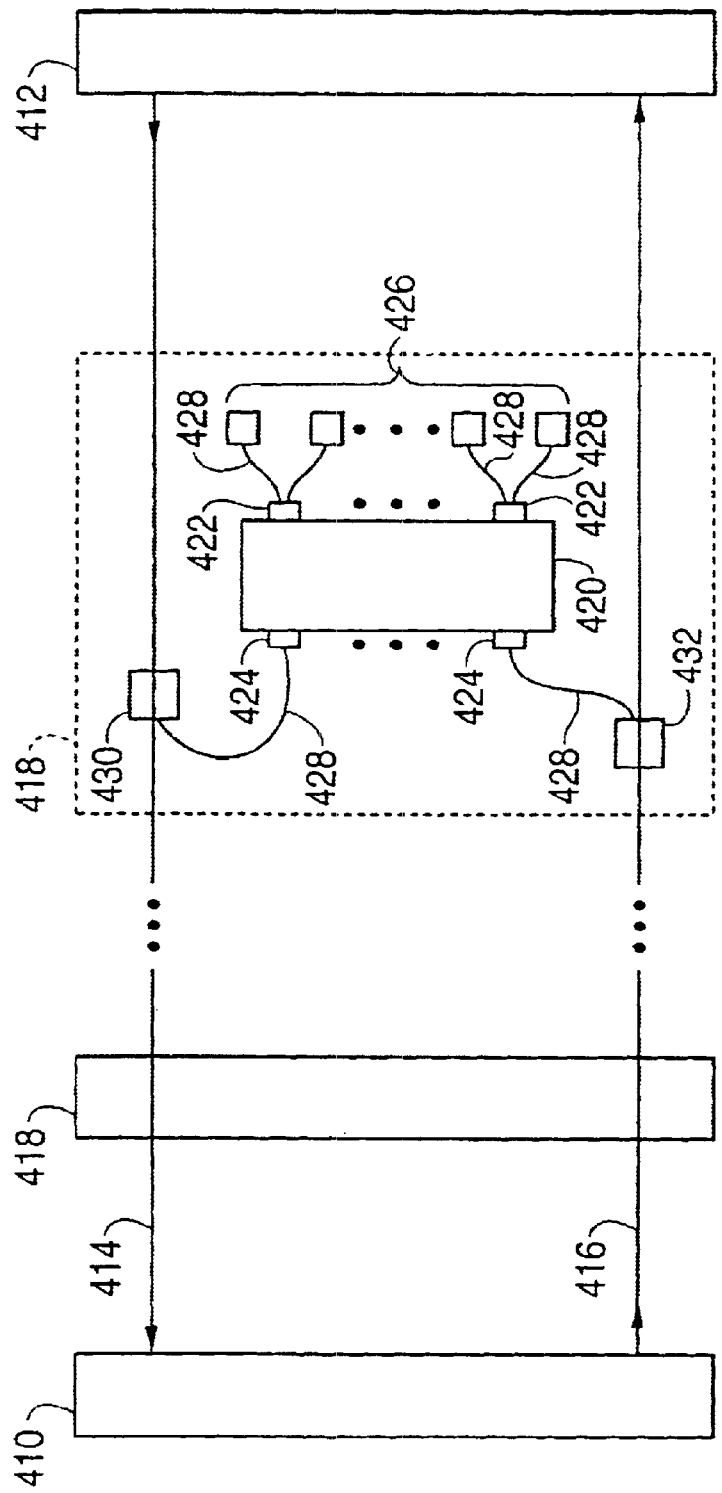
FIG. 8 is a schematic of an optical transmission system including an optical coupler system according to an embodiment of the present invention.

The staged coupler systems described above where the couplers are connected in series may be used in a variety of amplification systems, such as Raman or EDFA systems, and in a variety of optical transmission systems. FIG. 8 illustrates an optical transmission system employing at least one Raman amplifier 420 according to an aspect of the invention where the amplifier utilizes a staged coupler system as described above.

In general the optical transmission system schematically illustrated in FIG. 8 will contain a plurality of optical amplifiers 418. However, for ease of illustration only one of the optical amplifiers 418 in FIG. 8, the one outlined by the dashed box, shows the components of the amplifier. The optical transmission system includes first and second terminals 410, 412 remotely located from each-other. Each terminal 410, 412 is capable of operating as an optical signal transmitter and/or an optical signal receiver terminal. A first 414 and a second 416 optical transmission fiber connect the first 410 and the second 412 terminals. At least one Raman amplifier 418 is coupled to the transmission fibers 414 and 416.

Each amplifier 414 includes a coupler system 420, where the coupler system comprises staged couplers connected in series as described above with respect to FIGS. 4, 6 and 7. For ease of illustration the amplifier 414 is shown with only two inputs 422 and two outputs 424. In this case the coupler system 420 may comprise 2×2 couplers connected in series. Of course if the coupler system comprises P×V couplers where the individual couplers have more than 2 inputs and 2 outputs, the number of inputs and outputs of the coupler system 420 may be greater than two.

Each of the outputs 424 may provide pump radiation to a different optical transmission fiber. Thus, if the coupler system 420 has more than two outputs, the coupler system may provide pump radiation to more than the two transmission fibers 414 and 416 shown in FIG. 7.

Each amplifier 414 includes a number of pump radiation sources 426. The pump radiation sources may be semiconductor lasers or light emitting diodes, for example. Typically, the different pump radiation sources 426 will emit at different wavelengths. However, this is not required.

The pump radiation sources 426 may be arranged in sets, one set for each input of the coupler system 420. For example as shown in FIG. 8 a first set of pump radiation sources 426 is coupled to a first input of the inputs 422 and a second set of pump radiation sources 426 is coupled to a second input of the inputs 422 via optical fiber 428. The coupler system 420 couples the radiation from the pump radiation sources 426 and outputs the coupled pump radiation via the outputs 424.

The coupled pump radiation from the outputs 424 is then coupled to the respective first and second optical transmission fibers 414 and 416 via first and second pump-signal combiners 430 and 432, respectively. Together the coupler system 420, pump radiation sources 426 and pump-signal combiners 430, 432 comprise an optical pump assembly. The coupled pump radiation is coupled from the outputs 424 to the pump-signal combiners 430 and 432 via optical fibers 428. The pump radiation is coupled to the first and second optical transmission fibers 414 and 416 so that the pump radiation is contra-propagating relative to the propagation of optical signals along the first and second optical transmission fibers 414 and 416. Alternatively, the pump radiation can be coupled to the optical fibers to provide forward pumping (co-propragating) to amplify the optical signals.

Because the coupler system 420 provides pump radiation which has an improved power uniformity across the different outputs 424, the uniformity of the power of the pump radiation provided to the first and second optical transmission fibers 414 and 416 is improved. Thus, the uniformity of the gain provided by the amplifier 418 to each of the different optical transmission fibers 414 and 416 is also improved.

The preferred embodiments have been set forth herein for the purpose of illustration. However, this description should not be deemed to be a limitation on the scope of the invention. Accordingly, various modifications, adaptations, and alternatives may occur to one skilled in the art without departing from the scope of the claimed inventive concept.

What is claimed is:

1. An optical coupler system comprising:
   a first optical coupler having at least a first and a second input and a first and a second output; and
   a second optical coupler having at least a first and a second input and a first and a second output;
   wherein said first and second outputs of said first optical coupler are connected to said first and second inputs, respectively, of said second optical coupler via first and second optical links;
   wherein radiation that is input to said first input of said first optical coupler is coupled to both said first and second optical links to travel over first and second paths as first path radiation and second path radiation;
   wherein at said second coupler said second path radiation is incoherently combined with said first path radiation for output on said first output of said second coupler.

2. The optical coupler system of claim 1, wherein the radiation is input from a laser.

3. The optical coupler system of claim 1, wherein the optical output power of the first and second outputs of the second coupler is substantially the same.

4. The optical coupler system of claim 1, wherein each of the first and second couplers is a P×V coupler with P inputs and V outputs.

5. The optical coupler system of claim 1, wherein each of the first and second couplers is a 2×2 coupler with two inputs and two outputs.

6. The optical coupler system of claim 1, wherein the optical links comprise transmission optical fiber.

7. An optical coupler system comprising:
a first optical coupler having at least a first and a second input and a first and a second output; and
a second optical coupler having at least a first and a second input and a first and a second output;
wherein said first and second outputs of said first optical coupler are connected to said first and second inputs, respectively, of said second optical coupler via first and second optical links;
wherein said first and second links provide different optical paths between said first and second optical couplers such that portions of radiation energy that is input to said first input of said first optical coupler are combined incoherently at said first output of said second optical coupler.

8. The optical coupler system of claim 7, wherein said portions of said radiation energy include a first portion and a second portion and wherein:
said first portion travels along a first path from said first input of said first optical coupler to said first output of said first optical coupler over said first optical link to said first input of said second optical coupler and then to said first output of said second optical coupler;
said second portion travels along a second path from said first input of said first optical coupler to said second output of said first optical coupler over said second optical link to said second input of said second optical coupler and then to said first output of said second optical coupler and is coupled to said first portion within said second optical coupler to combine incoherently with said first portion for output on said first output of said second optical coupler.

9. The optical coupler system of claim 8, wherein said first and second paths have different optical path lengths.

10. The optical coupler system of claim 9, wherein said first and second paths vary in optical path length by at least a coherence length associated with said radiation energy.

11. The optical coupler system of claim 10, wherein said first and second paths vary in optical path length by more than 10 times said coherence length.

12. The optical coupler system of claim 7, wherein the optical output power of the first and second outputs of the second coupler is substantially the same.

13. The optical coupler system of claim 7, wherein each of the first and second couplers is a P×V coupler with P inputs and V outputs, where P is not equal to V.

14. The optical coupler system of claim 7, wherein each of the first and second couplers is a 2×2 coupler with two inputs and two outputs.

15. An optical coupler system for coupling radiation from a plurality of radiation sources, the system comprising:
a series of N couplers optically connected in series, where N is an integer greater than 1, the couplers in the series numbered i=1 to i=N, each ith coupler having at least first and second inputs and at least first and second ouputs;
a series of N−1 groups of optical links, the series of groups numbered j=1 to j=N−1, wherein each optical link of the jth group of optical links optically connects a respective output of the ith coupler to a respective input of the (i+1)th coupler when i=j,
wherein said optical links provide different optical paths between said first and Nth optical couplers such that portions of radiation energy that is input to said first input of said first optical coupler are combined incoherently at said first output of said Nth optical coupler.

16. The optical coupler system of claim 15, wherein said different optical paths have different optical path lengths.

17. The optical coupler system of claim 16, wherein said different optical paths vary in optical path length by at least a coherence length associated with said radiation energy.

18. The optical coupler system of claim 17, wherein said different optical paths vary in optical path length by more than 10 times said coherence length.

19. The optical coupler system of claim 15, wherein the optical output power of each of the outputs of the Nth coupler is substantially the same.

20. The optical coupler system of claim 15, wherein the radiation provided to the first coupler is provided by a laser.

21. The optical coupler system of claim 15, wherein each of the couplers is a 2×2 coupler with two inputs and two outputs.

22. The optical coupler system of claim 15, wherein each of the couplers is P×V coupler with P inputs and V outputs, where P is not equal to V.

23. A method of coupling radiation comprising:
inputting radiation from a first radiation source of a plurality of radiation sources into a first input of a first optical coupler having a plurality of inputs, wherein the first optical coupler is coupled to a second optical coupler via a plurality of optical links, the second coupler having a plurality of outputs including a first output;
propagating portions of the radiation along different respective optical paths between the first input of the first optical coupler and the first output of the second optical coupler;
coupling the portions of the radiation at the second coupler; and
wherein the optical links provide different optical paths between said first and second optical couplers such that the portions of radiation energy that is input to said first input of said first optical coupler are combined incoherently at the second coupler.

24. The method of claim 23 wherein the radiation comprises laser radiation.

25. The method of claim 23, wherein the optical output power at each of the outputs of the second coupler is substantially the same.

26. The method of claim 23, wherein said different optical paths have different optical path lengths.

27. The method of claim 26, wherein said different optical paths vary in optical path length by at least a coherence length associated with said radiation.

28. The optical coupler system of claim 27, wherein said different optical paths vary in optical path length by more than 10 times said coherence length.

29. An optical pump assembly comprising:
a plurality of pump radiation sources; and
an optical coupler system comprising:
a first optical coupler having at least a first and a second input and a first and a second output, the first and second input adapted for receiving radiation from respective radiation sources of the plurality of pump radiation sources; and
a second optical coupler having at least a first and a second input and a first and a second output;
wherein said first and second outputs of said first optical coupler are connected to said first and second inputs, respectively, of said second optical coupler via first and second optical links;
wherein said first and second links provide different optical paths between said first and second optical couplers such that portions of radiation energy that is input to said first input of said first optical coupler are combined incoherently at said first output of said second optical coupler.

30. The optical pump assembly of claim 29 further comprising:

a plurality of pump-signal combiners, each pump-signal combiner adapted to coupling radiation from the first and second outputs of the second coupler with an optical signal.

31. The optical pump assembly of claim 29, wherein the optical output power of each of the second outputs is substantially the same.

32. The optical pump assembly of claim 29, wherein each of the first and second couplers is a 2×2 coupler with two inputs and two outputs.

33. An optical transmission system comprising:

an optical signal transmitter adapted to transmit multiple optical signals;

an optical amplifier adapted to amplify at least one of the multiple optical signals, the optical amplifier comprising:

a plurality of pump radiation sources;

an optical coupler system comprising:

a first optical coupler having at least a first and a second input and a first and a second output, the first and second input adapted for receiving radiation from respective radiation sources of the plurality of pump radiation sources; and a second optical coupler having at least a first and a second input and a first and a second output;

wherein said first and second outputs of said first optical coupler are connected to said first and second inputs, respectively, of said second optical coupler via first and second optical links;

wherein said first and second links provide different optical paths between said first and second optical couplers such that portions of radiation energy that is input to said first input of said first optical coupler are combined incoherently at said first output of said second optical coupler; and a plurality of pump-signal combiners, each pump-signal combiner adapted to coupling radiation from the first and second outputs of the second coupler with an optical signal; and an optical signal receiver adapted to receive the multiple optical signals including the amplified at least one of the multiple optical signals.

34. The optical transmission system of claim 33, wherein the optical output power of each of outputs of the second coupler is substantially the same.

* * * * *